United States Patent [19]

Falconer et al.

[11] 3,878,468

[45] Apr. 15, 1975

[54] JOINT EQUALIZATION AND CARRIER RECOVERY ADAPTATION IN DATA TRANSMISSION SYSTEMS

[75] Inventors: David Duncan Falconer, Red Bank; Kurt Hugo Mueller, Matawan; Jack Salz, Fair Haven, all of N.J.; David Adams Spaulding, Mountain View, Calif.

[73] Assignee: Bell Telephone Laboratories, Incorporated, Berkeley Heights, N.J.

[22] Filed: Jan. 30, 1974

[21] Appl. No.: 437,978

[52] U.S. Cl. .................... 325/320; 178/88; 325/42; 333/18 R

[51] Int. Cl. ........................................... H04b 1/10

[58] Field of Search ................. 325/42, 65, 30, 320; 333/18 R; 328/155, 165; 178/67, 88

[56] References Cited

UNITED STATES PATENTS

| | | | |
|---|---|---|---|
| 3,462,687 | 8/1969 | Becker et al. | 325/42 |
| 3,560,855 | 2/1971 | Schroeder | 325/42 |
| 3,715,665 | 2/1973 | Chang | 325/42 |
| 3,715,670 | 2/1973 | Hirsch et al. | 325/42 |
| 3,727,136 | 4/1973 | Schroeder et al. | 325/42 |
| 3,755,738 | 8/1973 | Gitlin et al. | 325/42 |

*Primary Examiner*—Robert L. Griffin
*Assistant Examiner*—Jin F. Ng
*Attorney, Agent, or Firm*—J. P. Kearns

[57] ABSTRACT

An adaptive transversal equalizer acts jointly with a phase-jitter compensator to achieve substantially jitter-free passband equalization of a suppressed-carrier coherent data signal without the use of transmitted pilot tones. The received signal is split into quadrature components for separate equalization. The equalized outputs are demodulated to baseband, quantized and remodulated to passband. The differences between the equalized and remodulated outputs constitute error signals for direct control of tap-gain attenuator adjustments and after further data-directed processing control signals for recovery of a jitter-compensating demodulating carrierwave are generated.

In an alternative embodiment the received data signals, after splitting into quadrature components, are demodulated to baseband under the control of a first demodulating carrier-wave oscillator whose phase and frequency are determined by the intermodulation of respective quadrature-related equalizer outputs. The phase jitter is tracked in a second oscillator under the control of signals derived from the intermodulation of the inputs and outputs of a data signal decision circuit following the equalizers.

8 Claims, 7 Drawing Figures

JOINT EQUALIZATION AND CARRIER RECOVERY ADAPTATION IN DATA TRANSMISSION SYSTEMS

FIELD OF THE INVENTION

This invention relates to the correction of the distorting effects of transmission media of limited frequency bandwidth on digital data signals and in particular to the joint adaptive control of transversal equalizers and demodulating carrier-wave phase oscillators in phase-modulated (PM) and quadrature amplitude-modulated (QAM) data transmission systems.

BACKGROUND OF THE INVENTION

The transmission of digital data at high speeds, e.g., 9,600 bits per second, over band-limited transmission channels, such as telephone voice channels, requires precision control over carrier-wave frequency and linear phase distortion to a degree far beyond that necessitated by, or normally provided for, voice transmission alone. The primary impairment encountered on voice grade telephone channels is linear distortion due to variations in attenuation and delay imparted to components of different frequency. Linear distortion manifests itself in intersymbol interference wherein impulse response components overlap adjacent signaling intervals. Intersymbol interference is controllable with transversal equalizers.

Two further significant transmission impairments encountered on voice grade telephone channels are frequency offset and phase jitter. Frequency offset refers to the condition wherein the modulating and demodulating carrier waves available at respective transmitting and receiving terminals are not locked in frequency. The harmonic relationships among the several frequency components in the transmitted signal are thereby altered. Phase jitter refers to spurious variations in phase between successive pulses as reference to phase of a continuous oscillation. This condition affects the precision with which recovery of the information bearing baseband signal can be accomplished. Both of these impairments are manifestations of a slow, time-varying phase shift of the transmission-channel carrier wave.

Heretofore, it has been the practice to transmit along with the data signal pilot tones bearing a known relationship in frequency and phase to the modulating carrier wave. Whether these pilot tones are located within or at the edges of the transmission band, frequency space otherwise available for data signals is preempted and the amount of transmitted power allocable to the data signal is reduced. It would be desirable, therefore, to dispense with the transmission of pilot tones for carrier recovery purposes in a suppressed-carrier modulation system.

In U.S. Pat. No. 3,755,738 issued to R. D. Gitlin et al. on Aug. 28, 1973, a passband equalizer for phase-modulated data signals is disclosed. This equalizer employs separate in-phase and quadrature tapgain controls on a trasnversal, tapped delay-line structure. Quadrature-related signal components at all taps are selectively attenuated and combined to form the equalizer output based on an error different between a threshold vector component magnitude and the magnitude of one or the other of the quadrature-related equalizer output components. Viewing the quadrature-related signals at each tap location as vector components suggests the concept of rotating the resultant tap vectors to effect an overall output vector approaching the ideal vector. The equalizer adjustment procedure according to Gitlin et al assumes an arbitrary fixed phase reference and does not take into account a possible time-varying phase shift occasioned by the presence of a slow-speed frequency offset. Furthermore, the error criterion of Gitlin et al involves only one of the quadrature-related equalizer output signals.

In U.S. Pat. No. 3,581,207 issued May 25, 1971, R. W. Chang disclosed apparatus and method for joint setting of demodulating carrier phase, sampling time and transversal equalizer tap gains in a synchronous digital data transmission system. However, these joint settings were computed from demodulated signals and hence could not take into account transmission-channel phase shifts and frequency offsets at passband frequencies.

It is an object of this invention to improve passband equalizers employed in high-speed suppressed-carrier data transmission systems by jointly setting tap-gain adjustments and compensating for transmission-channel carrier phase shifts based on a symmetric error criterion involving both quadrature-related equalizer output signals.

It is another object of this invention to track phase shifts of the effective transmission-channel carrier-wave without the transmission of any pilot tones either inband or out-of-band.

It is a further object of this invention to provide a joint carrier recovery and equalization arrangement for compensating adaptively for the time-varying carrier-wave phase shift as well as for intersymbol interference in a coherent suppressed-carrier, quadrature-amplitude-modulation data transmission system.

SUMMARY OF THE INVENTION

The above and other objects are accomplished according to this invention by the combination of a transversal filter structure having first and second delay lines each with a plurality of synchronously spaced taps for respective in-phase and quadrature phase received signal components, an adjustable attenuator associated with each tap on each of the first and second delay lines, storage means for in-phase and quadrature-phase tap-gain coefficient values, means for alternately applying the respective coefficient values to the in-phase and quadrature-phase attenuators, equalized-signal demodulators, means for monitoring equalization errors and a phase-locked loop including a local oscillator for providing a frequency-offset and phase jitter compensated demodulating carrier wave to the signal demodulators.

The received passband transmission-channel signal is split into in-phase and quadrature-phase components before being applied to the respective first and second delay lines.

In one illustrative embodiment of this invention, the adaptive transversal equalizer operates on the quadrature-related passband components of the received data signal and is followed by the demodulator. The data digits demodulated to baseband from the equalizer outputs are quantized and remodulated up to passband. A comparison of the actual equalizer output components with the remodulated components yields in-phase and quadrature-phase error components for control of the equalizer tap gain coefficients. This is a form of data-decision directed error control. Multiplication of these same equalizer output and remodulated components yields an estimate of the phase error which is used to update the phase of the demodulating carrier wave associated with the channel-induced frequency offset and phase jitter.

In another illustrative embodiment of this invention the adaptive transversal equalizer operates on the quadrature-related baseband components of the received data signal after preliminary demodulation. Error signals for equalizer tap gain control are derived from a comparison of the actual equalizer output signals and these same signals quantized to reference values. Separate first and second demodulating carrier-wave oscillators are required in this embodiment for preliminary received-signal demodulation and for jitter compensation. The first oscillator is controlled by multiplication of the actual equalizer output signals and the quantized data signals. It is necessary that the phase jitter be separately compensated by the injection of a demodulating jitter estimate into the equalizer outputs because of the delay imposed by the baseband equalizer between the first oscillator and the jitter estimator. The second oscillator provides these jitter-compensating components through the multiplication of the quantized data decisions with the jitter-modulated equalizer outputs.

It is a feature of this invention that the intersymbol-interference and phase jitter are separately but interactively compensated in a coordinated manner despite their differing rates of occurrence.

It is another feature of this invention that any suppressed-carrier quadrature-amplitude-modulated or phase-modulated data signal can be equalized by the apparatus of this invention provided only that quadrature components of the received signal can be separated.

DESCRIPTION OF THE DRAWING

The above and other objects and features of this invention will be more fully appreciated from a consideration of the following detailed description and the drawing in which.

DETAILED DESCRIPTION

Figure 1:
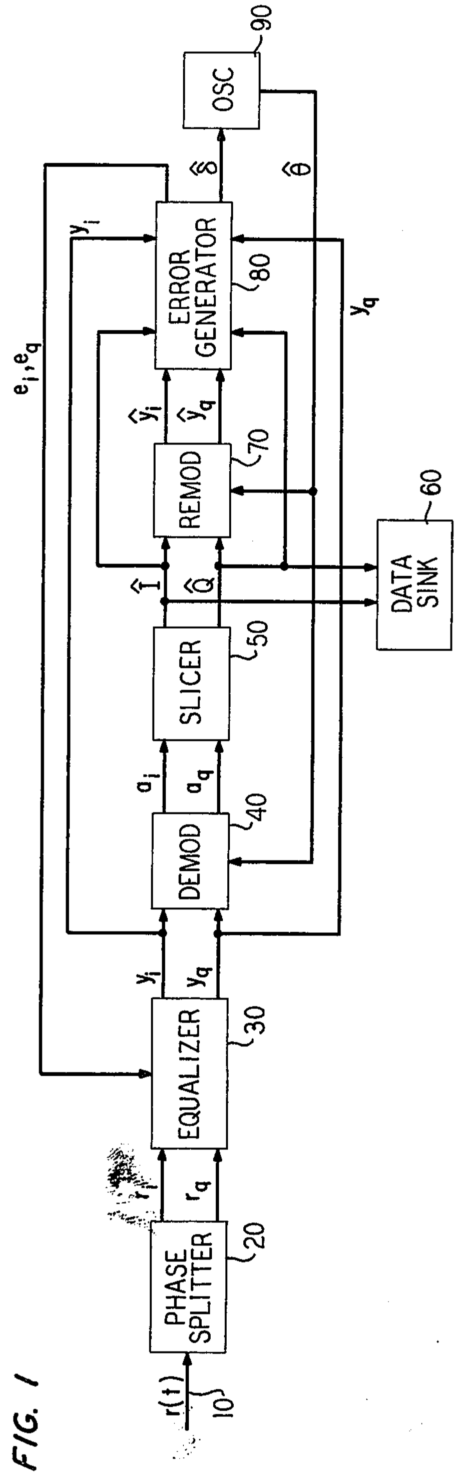
FIG. 1 is a block diagram of a digital data receiver for a quadrature amplitude-modulated data signal incorporating a passband equalizer and a jointly controlled demodulating oscillator according to this invention.

For purposes of illustration it is to be assumed that the equalizer-carrier recovery arrangement of this invention is being employed in a high-speed telephone-voiceband data transmission system employing quadrature amplitude modulation. The basic signaling rate is the reciprocal (1/T) of the baud (symbols per second) interval divided between two orthogonal, i.e., differing by ninety electrical degrees, phases of a common carrier frequency. The data signals applied to each orthogonal carrier phase may be independent, though synchronized, and multilevel. As an example, four-level baseband data signals can be applied to each orthogonal carrier phase for a practical maximum overall binary data rate of 4/T bits per second with a baud rate of T.

During each baud interval the data can be represented by the numbers I and Q, the in-phase and quadrature-phase components, respectively. In a typical amplitude-modulation (AM) signal format each takes one of the four possible values ±1, ±3. This invention is applicable to other two-dimensional signal forms; for example, $I = \cos A$, $Q = \sin A$ where A takes one of the values 0°, 22.5°, 45°, . . . 337.5° in a phase-modulation (PM) format. Furthermore, a combination AM-PM signal format can be realized.

In the $n$th baud interval the data symbols $I(n)$ and $q(n)$ modulate quadrature carriers, $\cos \omega_c t$ and $\sin \omega_c t$, resulting in the complex waveform $$S(t) + j\,\dot{S}(t) = \{I(n) + jQ(n)\}e^{j\omega_c t}. \tag{1}$$

It is apparent from equation (1) that the real part is $$S(t) = I \cos \omega_c t + Q \sin \omega_c t \tag{2}$$

and the imaginary part of equation (2) as $$\hat{S}(t) = I \sin \omega_c t - Q \cos \omega_c t. \tag{3}$$

Equation (2) represents the projection of equation (1) onto the real axis as the complex signal plane rotates at the carrier rate $\omega_c$. Only the real part defined by equation (2) is transmitted over the transmission channel. The respective real and imaginary parts of these equations are analogs of the in-phase and quadrature components of actual signals.

Viewing the modulation process as the rotation of the complex signal plane in the clockwise direction at the carrier frequency, one readily conceives the demodulation process at the receiver as that of stopping the rotation of the received signal by introducing an opposite counterclockwise rotation at the same carrier frequency. The difficulty arises in matching the demodulating carrier wave to the modulating carrier after the transmitted signal has been subjected to the distorting effects of the transmission channel. The received line signal can be expressed as $$r_i(t) = s_i(t) \cos [\omega_c t + \Delta t + \phi(t)] - s_q(t) \sin [\omega_c t + \alpha t + \phi(t)], \tag{4}$$

where $\Delta t$ = frequency offset $\phi(t)$ = phase jitter, whose major frequency components generally are less than 200 Hz; i.e., they are much less than the typical transmitted signal bandwidth.

The in-phase and quadrature-phase impulse responses, respectively, of the combination of the transmitting channel and filter can be represented by lowpass waveforms $p_i(t)$ and $P_q(t)$. Then the terms $s_i(t)$ and $s_q(t)$ in equation (5) are expressed as $$s_i(t) = \sum_n I(n)p_i(t-nT) + \sum_n Q(n)p_q(t-nT) \quad (5)$$

$$s_q(t) = \sum_n Q(n)p_i(t-nT) - \sum_n I(n)p_q(t-nT), \quad (6)$$

In the usual embodiment of the QAM receiver, the carrier frequency $\omega_c$ exceeds half the bandwidth of the transmitted signal. Thus, the $r_i(t)$, equation (5), is a true passband signal with no energy around zero frequency, and hence the Hilbert transform or $r_i(t)$ can be shown (see for example page 170 of Principles of Data Communication by Lucky, Salz and Weldon, McGraw-Hill, 1968) to be $$r_q(t) = s_i(t) \sin [\omega_c t + \Delta t + \phi(t)] + s_q(t) \cos [\omega_c t + \Delta t + \phi(t)]. \quad (7)$$

The real signal $r_q(t)$ is thus readily obtained from the real signal $r_i(t)$ by passing the received signal through a phase splitting network whose two outputs $r_i(t)$ and $r_q(t)$ are 90° phase shifted versions of each other.

If either the channel's frequency characteristic were ideal, or if perfect equalization were achieved, then for some choice of timing epoch $0 \leq t_0 \leq T$, $$p_i(t_0+nT) = 1 \text{ for } n = 0$$
$$= 0 \text{ for } n = \ldots, -1, 1, 2, 3, \ldots \quad (8a)$$

and $$p_q(t_0+nT) = 0 \text{ for } n = \ldots, -1, 0, 1, 2, 3, \ldots \quad (8b)$$

Hence at the sampling instant $t = t_0 + nT$ we would have $$s_i(t_0+nT) = I(n) \quad (9a)$$

$$s_q(t_0+nT) = Q(n). \quad (9b)$$

It may be assumed that $t_0$ is known and suppress it for convenience. Thus, with perfect equalization, intersymbol interference at the sampling instants is eliminated. If the equalized channel outputs are denoted by $y_i$ and $y_q$ at the sampling instant, $$y_i(nT) = I(n) \cos[\omega_c nT + \Delta nT + \phi(nT)] - Q(n)\sin[\omega_c nT + \Delta nT + \mathbf{100}\ (nT)] \quad (10a)$$

and $$y_q(nT) = T(n) \sin [\omega_c nT + \phi(nT)] + Q(n) \cos[\omega_c nT + \Delta nT + \phi(nT)]. \quad (10b)$$

Furthermore, if it is possible to generate $\theta(nT)$ equal to $[\omega_c nT + \Delta nT + \mathbf{100}\ (nT)]$ then at the correct sampling instant, the information symbols $I(n)$ and $Q(n)$ can be obtained ("demodulated") as follows:

$$a_i(n) = y_i(nT) \cos \theta(nT) + y_q(nT) \sin \theta(nT) = I(n) \quad (11a)$$
$$a_q(n) = y_q(nT) \cos \theta(nT) - y_i(nT) \sin \theta(nT) = Q(n) \quad (11b)$$

Equations (11) are realized, even with perfect equalization and zero noise, only when the phase reference $\theta(nT)$ is perfect. With an imperfect phase reference $$\theta(nT) = \delta(nT) + \omega_c nT + \Delta nT + \phi(nT), \quad (12)$$

and the central portion of equations (11a) and (11b) become, respectively, $$a_i(n) = I(n) \cos \delta(nT) + Q(n) \sin \delta(nT) \quad (13a)$$

and $$a_q(n) = Q(n) \cos\delta(nT) - I(n) \sin \delta(nT). \quad (13b)$$

The demodulated outputs $a_i(nT)$ and $a_q(nT)$ are then rotated by the angle $\delta(nT)$ from the ideal outputs $I(n)$ and $Q(n)$.

Figure 2:
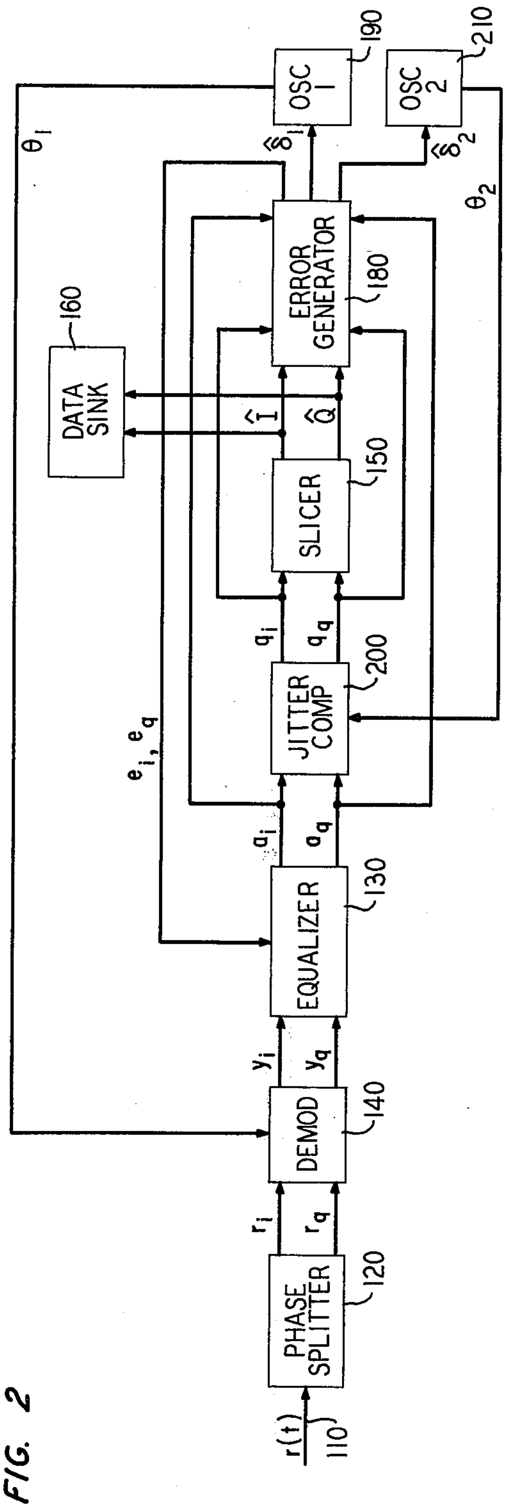
FIG. 2 is a block diagram of a digital data receiver for a quadrature amplitude-modulated data signal incorporating a baseband equalizer and two jointly controlled phase-jitter-compensated demodulating oscillators according to this invention.
Figure 3:
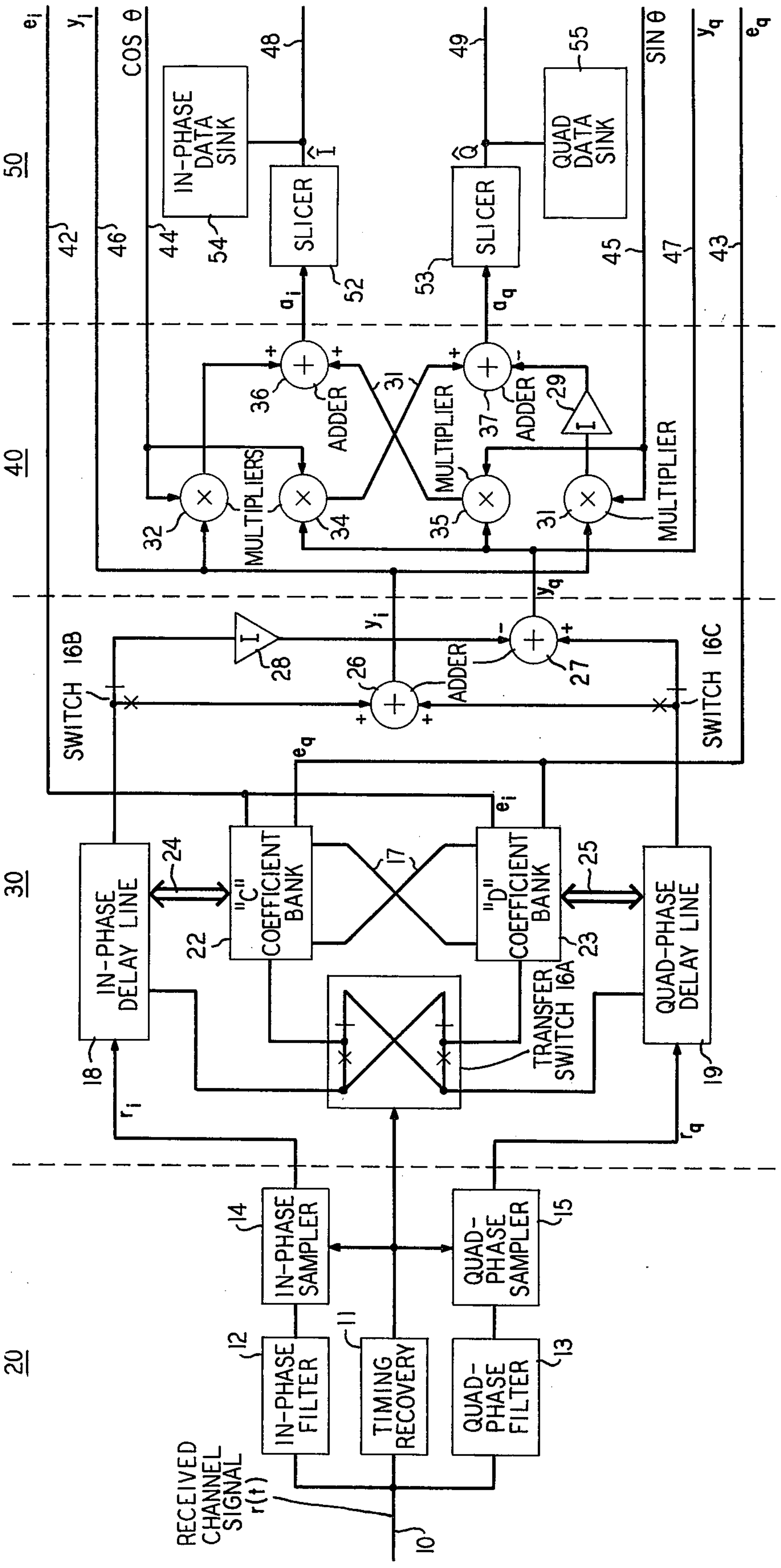
FIGS. 3 and 4, when arranged as shown in FIG. 5, are a detailed block schematic diagram of an adaptive passband equalizer combined with a phase-jitter and frequency-offset compensated demodulating carrier-wave oscillator according to this invention.
Figure 4:
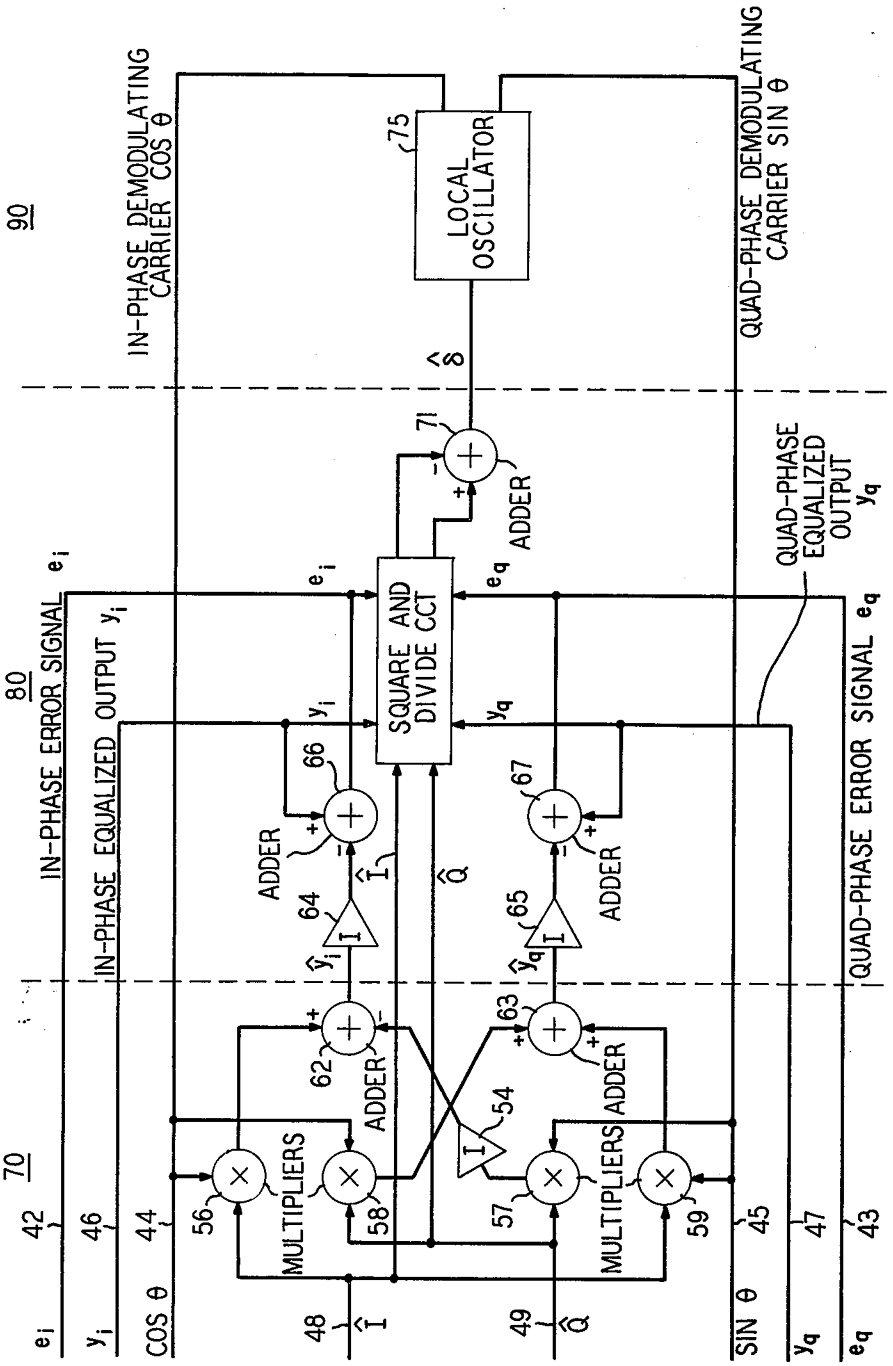

An ideal signal point plot or constellation, as shown in FIG. 3 on page 933 of an article by G. J. Foschini, R. D. Gitlin and S. B. Weinstein published in the Bell System Technical Journal (Vol. 52, No. 6) for July/August 1973, exhibits a finite number of discrete points defining permitted transmitted signal-vector terminations in a quadrature amplitude modulation transmission system. Due to noise, intersymbol interference and phase jitter, the totality of received signals is better represented by a scatter plot, such as is shown in FIG. 4 of the cited article. For a single received-signal vector FIG. 2 of the cited article shows an exaggerated angular displacement corresponding to the angle δ defined here as the angular rotation measured at the origin between an actual received signal point and the nearest ideal signal point. The nearest ideal signal point results from quantizing samples of the demodulator outputs. These quantized outputs are denoted hereinafter by $\hat{I}(n)$ and $\hat{Q}(n)$.

In order that the demodulator outputs $a_i(n)$ and $a_q(n)$ be as close as possible to the respective ideal outputs $I(n)$ and $Q(n)$ in spite of phase jitter, the receiver's phase reference $\theta(nT)$ must be updated in each baud interval. According to this invention, the phase reference and the equalizer tap coefficients are jointly updated by an algorithm derived from the gradient of a symmetrical expression for the squared error between the actual and ideal passband equalizer outputs. The algorithm for updating the phase reference in the $n$th baud interval is of the form $$\theta\{(n+1)T\} = \theta(nT) + \omega_c T - \alpha\hat{\delta}(nT). \quad (14)$$

The intermediate term $\omega_c T$ takes into account the phase displacement in the demodulating carrier-wave angle over one baud interval T at the angular carrier frequency $\omega_c$. The quantity $\alpha$ is a constant increment size which must be chosen to assure a suitable compromise between the noise, stability and jitter-tracking bandwidth of the system. The quantity $\hat{\delta}(nT)$ arises from the gradient expression. Before specifying it further, the passband transversal equalizer and the method of updating its tap coefficients will be described.

The transversal equalizer employed in the practice of this invention comprises two synchronously tapped delay lines, an in-phase delay line for storing samples of the received signal and a quadrature-phase delay line for storing samples of the Hilbert transform of the received signal. The sampling interval is the same as the baud interval T. Respective in-phase and quadrature-phase equalizer outputs are derived from a convolution of the respective in-phase and quadrature-phase tap signal with each of two sets of tap coefficients during each sampling interval T. The respective in-phase and quadrature-phase outputs of the equalizer during the nth baud interval ($n$ is to be inferred in subsequent equations) are defined in vector notation (indicated by underscoring) as $$y_i = C^T R_i + D^T r_q, \text{ and} \quad (15)$$

$$y_q = C^T r_q - D^T r_i, \quad (16)$$

where $y_i$ = in-phase output, $y_q$ = quadrature-phase output, $C^T$ = transposed column vector of in-phase tap-gain coefficients;

$D^T$ = transposed column vector of quadrature-phase tap-gain coefficients, $r_i$ = column vector in-phase samples taken at taps along the in-phase delay line, and $r_q$ = column vector of quadrature-phase samples taken at taps along the quadrature-phase delay line.

The C and D coefficients and phase reference $\theta$ are adjusted according to a symmetrical algorithm derived from the gradient of the quantity $$e_i^2 + e_q^2 = (y_i - \hat{y}_i)^2 + (y_q - \hat{y}_q)^2, \quad (17)$$

where $\hat{y}_i$ = quantized ideal in-phase equalizer output, and $\hat{y}_q$ = quantized ideal quadrature-phase equalizer output.

The ideal in-phase and quadrature phase equalizer outputs appearing in the error expression (17) are the receiver's latest decisions $\hat{I}$ and $\hat{Q}$ remodulated up to passband by the receiver's carrier phase reference; analogous to equations (11*a*) and (11*b*) for the received sampled passband signal in the absence of intersymbol interference, $$\hat{y}_i = \hat{I} \cos \theta - \hat{Q} \sin \theta \quad (18a)$$

$$\hat{y}_q = \hat{I} \sin \theta + \hat{Q} \cos \theta. \quad (18b)$$

The gradients of the symmetric error expression (17) taken with respect to the tap coefficient vectors C and D become $$\text{grad}_C (e_i^2 + e_q^2) = 2(e_i r_i + e_q r_q) \quad (19)$$

and $$\text{grad}_D (e_i^2 + e_q^2) = 2(e_i r_q - e_q r_i), \quad (20)$$

where the quantities in parentheses are estimates made on a per-baud basis without any averaging.

The coefficients C and D are updated every baud interval according to $$C_{n+1} = C(n) - \beta(e_i r_i + e_q r_q) \quad (21)$$

and $$D_{n+1} = D(n) - \beta(e_i r_q - e_q r_i), \quad (22)$$

where $\beta$ = increment size determined by starting (relatively high value), steady-state (relatively low value) and stability requirements.

The gradient of expression (17) taken with respect to the carrier phase reference $\theta$ is $$\text{grad}_\theta (e_i^2 + e_q^2) = 2(e_i \hat{y}_q - e_q \hat{y}_i), \quad (23a)$$

the right-hand side of which can also be written from (17) as $$\text{grad}_\theta (e_i^2 + e_q^2) = 2(y_i \hat{y}_q - y_q \hat{y}_i) \quad (23b)$$

or as $$\text{grad}_\theta (e_i^2 + e_q^2) = 2(e_i y_q - e_q y_i). \quad (23c)$$

under ideal conditions (no noise or residual intersymbol interference after equalization $I = \hat{I}$, $Q = \hat{Q}$), $y_i$ and $y_q$ are given by the right-hand sides of equations (10*a*) and (10*b*), respectively, and from (18*a*), (18*b*) and (23*b*) we can write $$\text{grad}_\theta (e_i^2 + e_q^2) = 2(\hat{I}^2 + \hat{Q}^2) \sin \delta, \quad (24)$$

where $\delta$ was defined by equation (12).

The quantity $\hat{\delta}$, used in equation (14) to update the carrier phase reference, is now specified to be the following modified gradient:

$$\hat{\delta} = \frac{(e_i y_q - e_q y_i)}{\hat{I}^2 + \hat{Q}^2}. \quad (25a)$$

Normalization by the factor $\hat{I}^2 + \hat{Q}^2$ is suggested by equations (24). Thus, equation (14), now fully specifying the carrier phase updating, is $$\theta\{(n+1)T\} = \theta(nT) + \omega_c T - \alpha \frac{(e_i y_q - e_q y_i)}{\hat{I}^2 + \hat{Q}^2} \quad (25b)$$

Since variations in the channel's pattern of intersymbol interference take place at a much slower rate than variations in its phase shift, $\alpha$ is greater than $\beta$ by one or two orders of magnitude, allowing tracking or relatively high frequency phase jitter. It may be noted that exactly equivalent equations for adjusting $\theta$ are implied by the equations (23*a*) and (23*b*), namely, $$\theta\{(n+1)T\} = \theta(nT) + \omega_c T - \alpha \frac{(e_i \hat{y}_q - e_q \hat{y}_i)}{\hat{I}^2 + \hat{Q}^2}, \quad (25c)$$

or $$\theta\{(n+1)T\} = \theta(nT) + \omega_c T - \alpha \frac{(y_i \hat{y}_q - y_q \hat{y}_i)}{\hat{I}^2 + \hat{Q}^2}. \quad (25d)$$

During the modem's start-up period, a known data sequence could be transmitted to replace the receiver decisions in the above adjustment algorithms. After a suitable time, decision-directed operation could start based on the receiver's own decisions. In normal operation, decision errors are expected to be so infrequent as to have little effect on the adjustments.

In the alternative receiver structure, shown in FIG. 2, the two quadrature components $r_i(t)$ and $r_q(t)$ are demodulated to the sampled baseband signals $y_i$ and $y_q$ prior to equation as follows:

$$y_i = r_i\,(nT)\cos\theta_1(nT) + r_q\,(nT)\sin\theta_1\,(nT) \quad (26a)$$

$$y_q = r_q\,(nT)\cos\theta_1\,(nT) - r_i\,(nT)\sin\theta_1\,(nT), \quad (26b)$$

where $\theta_1\,(nT)$ is a demodulating phase reference which includes the carrier angle $\omega_c nT$ as well as an estimate of slowly varying (low frequency) phase jitter and frequency offset components. The baseband equalizer structure is identical to that of the passband equalizer described by equations (15) and (16), with C and D tap coefficient vectors and quadrature-related outputs $a_i$ and $a_q$ given by $$a_i = C^T y_i + D^T y_q \quad (27)$$

$$a_q = C^T y_q - D^T y_i\,, \quad (28)$$

where $y_i$ = column vector of in-Phase samples taken at taps along the in-phase delay line, and $y_q$ = column vector of quadrature-phase samples taken at taps along the quadrature-phase delay line.

The equalized samples may still contain high frequency jitter components, which are removed by a second demodulation. Thus, $$q_i = a_i\cos\theta_2(nT) + a_q\sin\theta_2\,(nT) \quad (29a)$$

$$q_q = a_q\cos\theta_2\,(nT) - a_i\sin\theta_2(nT), \quad (29b)$$

where $\theta_2\,(nT)$ is an estimate of the high frequency jitter components (variations of the carrier phase shift which are appreciable within a period of several baud intervals). The demodulation operation of equations (29a) and (29b) can be simplified further by replacing cos $\theta_2$ by unity and sin $\theta_2$ by $\theta_2$, since the peak jitter angle $\theta_2$ is generally very small.

The samples $q_i$ and $q_q$ are then quantized to form the receiver's decisions $\hat{I}$ and $\hat{Q}$. These also serve as reference signals in the algorithms for adjusting the equalizer tap coefficients and the two separate demodulator phase references.

The baseband equalizer tap coefficients C and D and the preliminary demodulation phase reference $\theta_1$ (nT) are adjusted according to the symmetric squared error expression $$e_{li}^2 + e_{lq}^2 = (a_i - \hat{I})^2 + (a_q - \hat{Q})^2, \quad (30)$$

where $$e_{li} = a_i - \hat{I} \quad (31)$$

$$e_{lq} = a_q - \hat{Q} \quad (32)$$

and $a_i$ and $a_q$ are defined by equations (27) and (28). The gradients of the symmetric error expression with respect to C, D and $\theta_1$, respectively, are $$\mathrm{grad}_C(e_{li}^2 + e_{lq}^2) = 2(e_{li}y_i + e_{lq}y_q) \quad (33a)$$

$$\mathrm{grad}_D(e_{li}^2 + e_{lq}^2) = 2(e_{li}y_q - e_{lq}y_i) \quad (33b)$$

and $$\mathrm{grad}_{\theta_1}(e_{li}^2 + e_{lq}^2) = 2(a\hat{Q} - a_q\hat{I}). \quad (33c)$$

The updating of the C and D coefficients and of the phase reference $\theta_1$ takes place once every baud interval, based on a gradient algorithm. The respective updating equations are $$C(n+1) = C(n) - \beta(e_{li}y_i + e_{lq}y_q) \quad (34a)$$

$$D(n+1) = D(n) - \beta(e_{li}y_q - e_{lq}y_i) \quad (34b)$$

and $$\theta_1\{(n+1)T\} = \theta_1(nT) + \omega_c T - \alpha_1\frac{(a_i\hat{Q} - a_q\hat{I})}{\hat{I}^2 + \hat{Q}^2}, \quad (34c)$$

where $\beta$ and $\alpha_1$ are constant increment sizes.

The secondary demodulation phase reference $\theta_2$ (nT) is adjusted according to the symmetric squared error expression $$e_{2i}^2 + e_{2q}^2 = (q_i - \hat{I})^2 + (q_q - \hat{Q})^2, \quad (35)$$

where $$e_{2i} = Q_i - \hat{I} \quad (36)$$

$$e_{2q} = q_q - \hat{Q} \quad (37)$$

and $q_i$ and $q_q$ are the unquantized receiver outputs defined by equations (29a) and (29b). The gradient of the above error expression with respect to $\theta_2$ is $$\mathrm{grad}_{\theta_2}\,(e_{2i}^2 + e_{2q}^2) = 2(q_i\hat{Q} - q_q\,\hat{I}). \quad (38)$$

Accordingly, the gradient algorithm used to update $\theta_2(nT)$ is $$\theta_2\{(n+1)T\} = \theta_2(nT) - \alpha_2\frac{(q_i\hat{Q} - q_q\hat{I})}{\hat{I}^2 + \hat{Q}^2}, \quad (39)$$

where $\alpha_2$ is a constant increment size. To allow for tracking of high frequency jitter, $\alpha_2$ is greater than $\alpha_1$ by an order of magnitude or more. The increment size $\alpha_1$ is greater than $\beta$typically by about an order of magnitude in order than the burden of tracking low frequency jitter is left to the preliminary demodulator rather than to the baseband equalizer.

As in the passband receiver, equivalent gradient expressions suggest alternate means of updating $\theta_1$ and $\theta_2$, namely, $$\theta_1\{(n+1)\,T\} = \theta_1\,(nT) + \omega_c T - \alpha\hat{\delta}_1 \quad (40)$$

and $$\theta_2 \{ (n+1) T\} = \theta_2 (nT) - \alpha\hat{\delta}_2 \quad (41)$$

where $$\hat{\delta}_1 = \frac{a_q e_{1i} - a_i e_{1q}}{\hat{I}^2 + \hat{Q}^2} \text{ or}$$

$$\hat{\delta}_1 = \frac{\hat{Q} e_{1i} - \hat{I} e_{1q}}{\hat{I}^2 + \hat{Q}^2} \quad (42)$$

and $$\hat{\delta}_2 = \frac{q_q e_{2i} - q_i e_{2q}}{\hat{I}^2 + \hat{Q}^2} \text{ or}$$

$$\hat{\delta}_2 = \frac{\hat{Q} e_{2i} - \hat{I} e_{2q}}{\hat{I}^2 + \hat{Q}^2}. \quad (43)$$

FIG. 1 represents in simplified block diagram form a receiver for a quadrature amplitude modulated digital data transmission system including a passband adaptive transversal equalizer and a demodulating-carrier wave oscillator control according to this invention. The receiver broadly comprises quadrature phase splitter 20 following input line 10, transversal equalizer 30, demodulator 40, threshold slicer 50, remodulator 70, error generator 80, demodulating carrier wave oscillator 90, and data sink 60. A passband modulated digital data signal of the type defined by equation (4) is received on line 10 and is split into real and imaginary parts as represented by equations (5) and (6). Both real and imaginary components are sampled and operated on in equalizer 30 to minimize intersymbol interference under the control of error signals $e_i$ and $e_q$ from error generator 80. The outputs $y_i$ and $t_q$ of equalizer 30 are defined by equations (15) and (16). These outputs are demodulated to baseband analog values $a_i$ and $a_q$ in demodulator 40 under control of the phase jitter and frequency offset compensated demodulating carrier wave $\hat{\theta}$ from oscillator 90. Analog signals $a_i$ and $a_q$ are in turn quantized to discrete values Î and Q̂ in threshold slicer 50. Values Î and Q̂ are decoded to serial bit streams in data sink 60 by conventional means. These data values are further remodulated to the transmission channel passband responsive to the carrier wave from oscillator 90 to provide reference signals $\hat{y}_i$ and $\hat{y}_q$ from which the distortion errors can be derived. Error generator 80 compares the remodulated reference outputs $\hat{y}_i$ and $\hat{y}_q$ with the equalizer outputs $y_i$ and $y_q$ in accordance with equations (17, 18*a* and 18*b*) to obtain error control signals $e_i$ and $e_q$ to be applied to equalizer 30. Error generator 80 further operates on the reference baseband signals Î and Q̂ and equalizer output signals $y_i$ and $y_q$ in accordance with equation (25*a*) to obtain the demodulating carrier wave angular error $\hat{\delta}$. Error $\delta$ controls the oscillator 90 in accordance with equation (14) to produce the jitter and offset compensated demodulating carrier wave defined by equation (12). Since error components $e_i$ and $e_q$ control both equalizer tap-gain adjustments and demodulating carrier-wave shifts, there is optimum joint compensation of intersymbol interference and carrier phase shift.

FIG. 2 is a simplified block diagram of an alternative embodiment of this invention in which the received signal is demodulated before equalization and the joint error signals are derived at baseband instead of at passband. The baseband receiver broadly comprises quadrature phase splitter 120 following input line 110, demodulator 140, equalizer 130, jitter compensator 200, threshold slicer 150, error generator 180, data sink 160, demodulating carrier-wave oscillator 190 and jitter-compensating oscillator 210. A passband modulated digital data signal of the same type as that postulated for reception by the receiver of FIG. 1 is received on line 110 and is split into real and imaginary parts $r_i$ and $r_q$. The passband parts are demodulated to baseband before equalization into in-phase component $y_i$ and quadrature-phase component $y_q$. The latter baseband components are operated on by equalizer 130 under the control of error signals $e_i$ and $e_q$ from error generator 180 to minimize intersymbol interference. The baseband output signals $a_i$ and $a_q$ from equalizer 130 following equations (27) and (28) are first operated on by jitter compensator 200, as indicated by equations (29*a*) and (29*b*) under the control of the output of oscillator 210 which has been arranged to track rapidly varying phase jitter and frequency offset. In effect, jitter compensator 200 provides a second step of demodulation. The dejittered outputs $q_i$ and $q_q$ are quantized in slicer 150 to predetermined discrete digital levels to form signals Î and Q̂, which are in turn applied jointly to data sink 160 and to error generator 180. Generator 180 obtains the equalizer error control signals $e_i$ and $e_q$ from the differences between the direct outputs $a_i$ and $a_q$ of equalizer 130 and the quantized outputs Î and Q̂ of slicer 150. The quantities $a_i$, $a_q$, $q_i$, $q_q$, Î and Q̂ find further use following equations (34*c*) and (39) in controlling the phase references $\theta_1$ and $\theta_2$, respectively.

Figure 5:
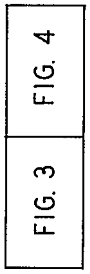

FIGS. 3 and 4 when placed side by side as indicated in FIG. 5 form a detailed block schematic diagram of a quadrature amplitude modulated digital data receiver employing a passband equalizer. FIGS. 3 and 4 are divided by broken lines so as to conform to FIG. 1.

Section 20 comprises the phase splitter operating on the received signal. In one inventive embodiment filters 12 and 13 are conventional bandpass filters differing in phase shift by 90°. In an alternative embodiment filter 13 rotates all frequency components by minus 90° and filter 12 is an all-pass filter with delay matching that of filter 13. Timing recovery 11 generates a timing wave at the baud rate from signal transitions or by other conventional means to control sampling circuits 14 and 15 in the respective in-phase and quadrature-phase channels and also to control the transfer rate of delay lines 18 and 19. In addition transfer switch 16 derives a timing signal to cause operation at twice the baud rate.

Section 30 constitutes the adaptive equalizer which comprises in-phase and quadrature-phase delay lines 18 and 19, C and D coefficient banks 22 and 23, transfer switch 16 including input double-pole double-throw transfer 16A and output single-pole double-throw transfers 16B and 16C, adders 26 and 27 and inverter 28.

Figure 6:
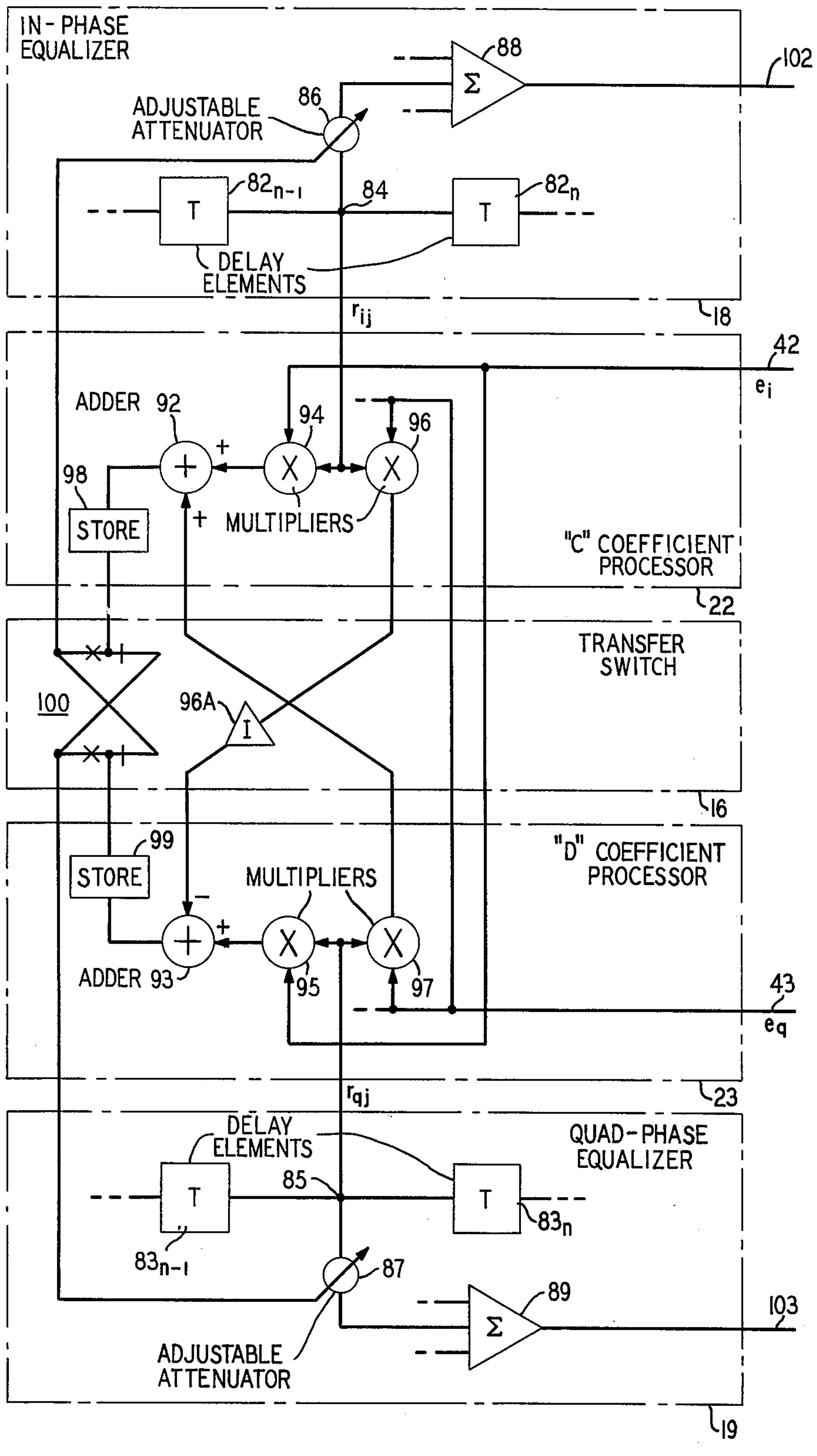
FIG. 6 is a block schematic diagram showing the details of individual tap-attenuator gain control according to this invention.

The equalizer section is shown in more detail in FIG. 6. Each delay line 18 and 19 comprises a plurality of delay elements (such as $82_{n-1}$ and $82_n$ in in-phase delay line 18 and $83_{n-1}$ and $83_n$ in quadrature-phase delay line 19) separated by taps 84 and 85 on the order of 31 in number. The delay selected between taps is the synchronous signaling or baud interval T. Taps 84 and 85 in FIG. 6 are assumed to be located at equal delay intervals from the inputs of their delay lines. With each tap 84 or 85 is associated an adjustable attenuator 86 or 87 whose transmission ratio is determined by the state of coefficient processors 22 and 23. The outputs of in-phase attenuators, such as that numbered 86, are combined in summation circuit 88 for application to bus 102. Similarly, the outputs of quadrature-phase attenuators, such as that numbered 87, are combined in summation circuit 89 for application to bus 103. Due to the interactions between in-phase and quadrature-phase tap signals as defined in equations (14) and (15), it is necessary to provide duplicate delay lines and coefficient processors (a total of four) for each of the in-phase and quadrature-phase signal samples or in the alternative to provide one each of in-phase and quadrature-phase delay lines and coefficient processors and time-share the latter during each baud interval. The latter alternative is illustrated in FIG. 6.

Accordingly, transfer switch 16 is provided at each tap to time-share during each baud interval the coefficient values stored in locations 98 and 99 with attenuators 87 and 88. The transfer contacts 100 of transfer switch 16 are shown in detached form by indicating make contacts as crosses and break contacts as a perpendicular stroke. In coincidence with the operation of contacts 100 (corresponding to those designated 16A in FIG. 3) contacts 16B and 16C function to transfer the outputs of summing circuits 88 and 89 alternately between adders 26 and 27.

In coefficient processor 22 in FIG. 6 the real received signal sample $r_{ij}$ at tap 84 in-phase delay line 18 is correlated in multipliers 94 and 96 with in-phase error signal $e_i$ from lead 42 and with quadrature-phase error signal $e_q$ from lead 43. The results of these correlations are applied as shown directly to adder 92 in C coefficient processor 22 and through inverter 96A to adder 93 in D coefficient processor 23. At the same time the result of the correlation of the respective error signals $e_i$ and $e_q$ with the quadrature-phase received signal sample $r_{qj}$ at tap 85 on quadrature-phase delay line 19 in multipliers 95 and 97 are applied to adder 92. The sum output of adder 92 adjusts the C coefficient value stored in store 98. Similarly, the sum output of adder 93 adjusts the D coefficient value stored in store 99.

The coefficient values stored in stores 98 and 99 are continually updated by changes in the error signals $e_i$ and $e_q$ and are applied during each baud interval to each of attenuators 86 and 87.

In FIG. 3 cables 24 and 25 interconnecting delay lines 18 and 19 with coefficient banks C and D contain the several tap signal leads. During one-half of each baud interval the results of the application of the C coefficients to the in-phase signal samples and the D coefficients to the quadrature-phase signal samples are combined in adder 26 to form the in-phase equalized output $y_i$ on lead 46. During the other half of each baud interval the results of the application of the D coefficients to the in-phase signal samples and the C coefficients to the quadrature-phase signal samples are combined (after inversion of the in-phase summation in inverter 28) to adder 27 to form the quadrature-phase equalized output $y_q$ on lead 47.

In section 40 of FIG. 3 the equalizer outputs $y_i$ and $y_q$ are demodulated to baseband by means of multipliers 31, 32, 34 and 35, inverter 29 and adders 36 and 37. Multipliers 32 and 34, under the control of an in-phase demodulating carrier wave on lead 44 and multipliers 31 and 35, under the control of a quadrature-phase demodulating carrier wave on lead 45, operate on respective equalizer outputs $y_i$ and $y_q$ to form baseband signals $a_i$ and $a_q$ in the outputs of adders 36 and 37. The output of multiplier 31 is inverted in inverter 29 before application to adder 37 as shown. The output of multiplier 34 is directly connected to adder 37, as the outputs of multipliers 32 and 35 are directly connected to adder 36. Section 40 implements equations (11*a*) and (11*b*).

The signals $a_i$ and $a_q$ are in analog form and are not precisely quantized according to preassigned discrete digital levels. Accordingly, section 50 of FIG. 3 provides threshold slicers 52 and 53 to quantize signals $a_i$ and $a_q$ to digital values $\hat{I}$ and $\hat{Q}$ on leads 48 and 49. The $\hat{I}$ and $\hat{Q}$ signals are also applied to data sinks 54 and 55 to obtain the serial output data in a conventional manner.

The quantized baseband signals $\hat{I}$ and $\hat{Q}$ from slicers 52 and 53 on leads 48 and 49 are further processed in section 70 of FIG. 4 to generate passband reference signals from which to obtain error signals for tap-gain adjustment and demodulating carrier wave phase control. The circuit shown in section 70 constitutes a remodulator which is the direct counterpart of demodulator 40 in FIG. 3. Remodulator 70 comprises multipliers 56 through 59, adders 62 and 63 and inverter 54. Multipliers 56 and 58, under the control of an in-phase carrier wave on lead 44, and multipliers 57 and 59, under the control of a quadrature-phase carrier wave on lead 45, operate on respective quantized baseband signals $\hat{I}$ and $\hat{Q}$ to form passband reference signals $\hat{y}_i$ and $\hat{y}_q$ in the outputs of adders 62 and 63. The output of multiplier 57 is inverted in inverter 54 before being applied to adder 62. The output of multiplier 56 is directly connected to adder 62, as the outputs of multipliers 58 and 59 are directly connected to adder 63.

In section 80 of FIG. 4 error signals $e_i$ and $e_q$ are derived from the differences between actual equalizer output signals $y_i$ and $y_q$ and remodulated reference outputs $\hat{y}_i$ and $\hat{y}_q$. Furthermore, local oscillator control signal $\delta$ is derived in accordance with equation (14). The error generation circuits of section 80 comprise adders 66, 67 and 71, inverters 64 and 65, and square and divide circuit 69. Both reference signals $\hat{y}_i$ and $\hat{y}_q$ are inverted in inverters 64 and 65 before application to adders 66 and 67. At the same time equalizer output signals on leads 46 and 47 are applied to respective adders 66 and 67. In-phase error signal $e_i$ and quadrature-phase error signal $e_q$ are thus provided on leads 42 and 43 for use in updating the tap-gain coefficients of equalizer 30.

Square and divide circuit 69 can employ conventional operational circuits such as full-wave rectifiers for the function of squaring the quantized baseband signals $\hat{I}$ and $\hat{Q}$ multipliers for forming the products $e_i y_q$ and $e_q y_i$ and operational amplifiers having feedback multipliers for performing the function of dividing each of these products by the sum of the squares of the quantized signals, and adder 71 arranged to take the difference of the divided signals. Operational circuits for performing nonlinear squaring and division functions are described in Chapter 7 of the text Operational Amplifiers edited by J. G. Graeme et al. and published by McGraw Hill Book Company in 1971.

Alternatively, in order to maximize digital implementation square and divide circuit 69 in combination with adder 71 can be realized with read-only memories functioning as look-up tables.

The output of adder 71 corresponds to the solution of equation (25*a*). This output is applied in accordance with equation (25*b*) to local oscillator 75, which has as a nominal frequency that of the modulating carrier wave. The control signal $\hat{\delta}$ operates on the phase and frequency of oscillator 75 in the manner of a phase-locked loop control signal. The output of oscillator 75 follows the phase jitter and frequency offset present in the received signal and is applied to demodulator 40 and remodulator 70 shown in FIGS. 1, 3 and 4 over leads 44 and 45. Oscillator 75 provides two carrier outputs differing in phase by 90 ° to derive the appropriate demodulators and multipliers.

Figure 7:
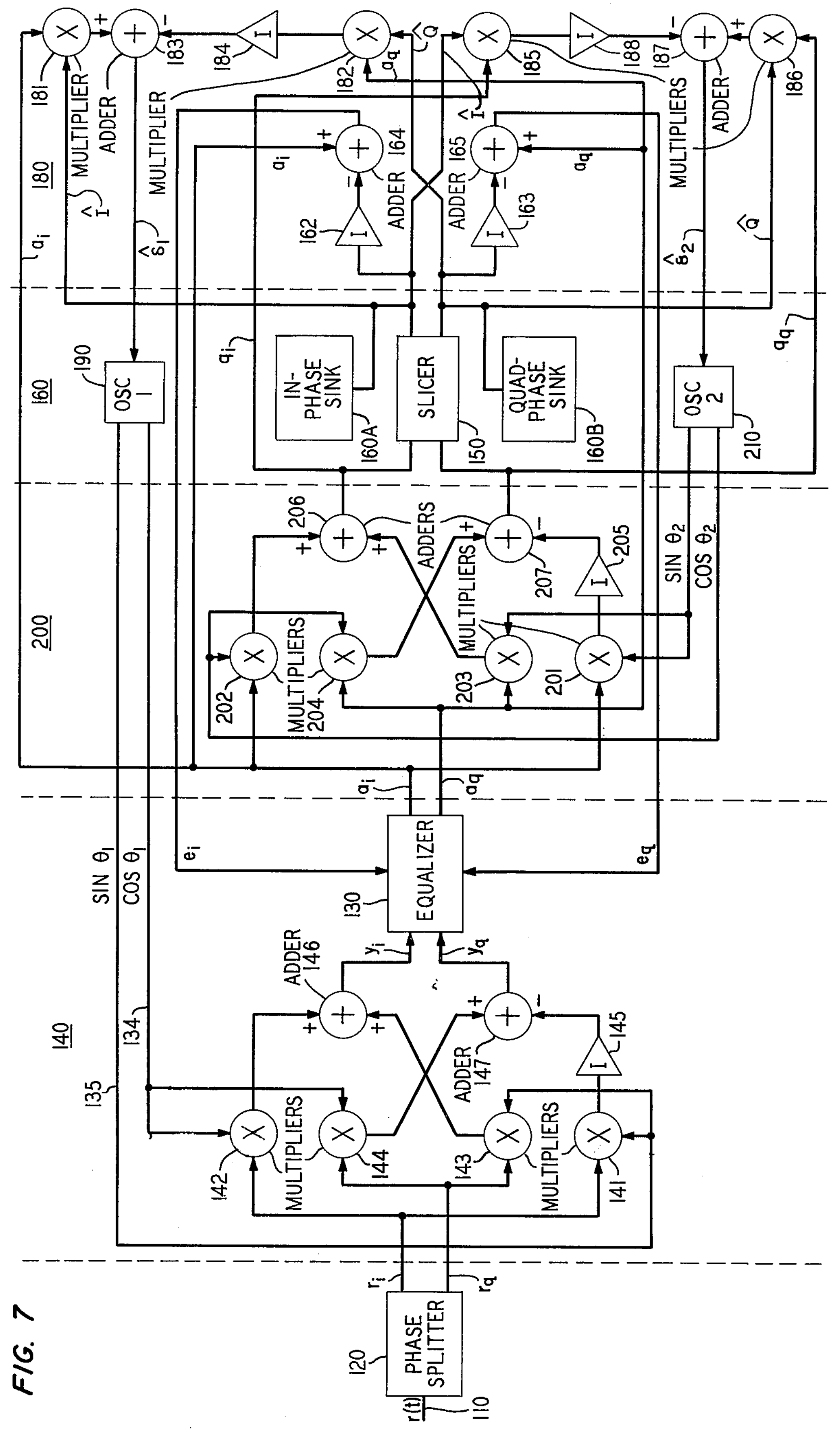
FIG. 7 is a block schematic diagram of an adaptive baseband equalizer combined with a phase-jitter and frequency-offset compensated demodulating carrier-wave oscillators according to this invention.

FIG. 7 depicts an alternative embodimment for joint control of an adaptive equalizer, and phase jitter and frequency offset of the demodulating carrier wave in a quadrature amplitude-modulated digital data transmission system. FIG. 7 is a more detailed illustration of the baseband arrangement of FIG. 2. In FIG. 7 the principal demodulator precedes the equalizer and error signals are derived at the level of the baseband frequencies. Highfrequency jitter after traversing the multiband delay of the equalizer becomes largely uncorrelated with that in the received signal. Consequently, the principal demodulator preceding the equalizer cannot compensate for high-frequency jitter, although it does compensate for frequency offset and low frequency jitter. An auxiliary demodulator is therefore provided to mop up high frequency jitter.

The input section of the baseband receiver comprising input line 110 and phase splitter 120 is identical to that found in the passband receiver of FIG. 3.

Section 140 of FIG. 7 is a demodulator comprising multipliers 141 through 144, adders 146 and 147 and inverter 145. This demodulator is controlled by an in-phase demodulating carrier wave on lead 134 connected to multipliers 142 and 144 and by a quadrature-phase demodulating carrier wave on lead 135 connected to multipliers 141 and 143. The multiplier outputs are combined in adders 146 and 147 as shown in FIG. 7 (the output of adder 141 is inverted in inverter 145 before qpplication to adder 149) to form baseband in-phase and quadrature-phase components $y_i$ and $y_q$ for application to equalizer 130. Equalizer 130 is identical in structure to that in FIGS. 3 and 6. The traversing signals are at baseband, however, and the error control signals are derived at baseband.

Section 200 of FIG. 7 constitutes an auxiliary demodulator which is identical in structure to that in section 140. It comprises multipliers 201 through 204, adders 206 and 207 and inverter 205. Functionally, it is the same as the principal demodulator except that the demodulating waves contain the phase jitter component $\hat{\theta}$ and it operates on output signals $a_i$ and $a_q$ from equalizer 130 to form dejittered signals $q_i$ and $q_q$ in accordance with equations (29*a*) and (29*b*).

Signals $q_i$ and $q_q$ are sliced in threshold slicer 150 to form quantized reference signals $\hat{I}$ and $\hat{Q}$, from which in-phase and quadrature-phase data signals are derived in sinks 160A and 160B.

Equalizer error control signals $e_i$ and $e_q$ are obtained at baseband by taking the differences between equalizer output signals $a_i$ and $a_q$ and quantized signals $\hat{I}$ and $\hat{Q}$ in adders 164 and 165 as shown in FIG. 7. Signal $\hat{I}$ and $\hat{Q}$ are inverted in inverters 162 and 163 before application to adders 164 and 165.

Two demodulating carrier-wave oscillators 190 and 210 are required as previously explained. Oscillator 190 provides the principal demodulating wave. Its control signal is obtained by taking the difference in the correlations of actual ($a_i$, $a_q$) and reference ($\hat{I}$, $\hat{Q}$) signals from equalizer 130 and slicer 150 in multipliers 181 and 182 and adder 183 following equation (34*c*). Similarly, oscillator 210 provides the auxiliary demodulating wave and its control signal is obtained by correlating the outputs $q_i$ and $q_q$ of auxiliary demodulator 200 with reference signals $\hat{I}$ and $\hat{Q}$ in multipliers 185 and 186 and adder 187 as shown. Inverters 184 and 188 invert the outputs of multipliers 182 and 185 as shown. As previously noted, auxiliary demodulator 200 can be simplified by replacing cos $\theta_2$ by unity (a direct connection to adders 206 and 207 from equalizer 130) and sin $\theta_2$ by $\theta_2$ itself.

The equalizer of this invention can be realized using a carrier frequency and baud rate of 2,400 Hz and four-level data encoding to yield an equivalent serial binary transmission rate of 9,600 bits per second over conditioned telephone voice channels.

While this invention has been described in terms of specific illustrative embodiments, it is to be understood that its principles are susceptible of a wide degree of modification within the scope of the following claims.

What is claimed is:

1. In a data receiver for data signals synchronously modulated onto quadrature phases of a common carrier wave including a transversal equalizer structure having a delay line with taps located at synchronous intervals therealong for each of the quadrature-related received signals, an adjustable attenuator connected to each tap on each delay line and a corresponding correlator jointly responsive to error and tap signals for determining the adjustment of each attenuator, and combining circuits for forming each of the in-phase and quadrature-phase equalizer outputs; and further including a demodulating carrier-wave source, a demodulator for respective in-phase and quadrature-phase received-signal components, and a data recovery circuit operating on demodulated in-phase and quadrature-phase received signals to derive quantized baseband data signals: the improvement comprising means for forming in-phase and quadraturephase error signals from the differences between respective in-phase and quadrature-phase outputs of said equalizer and said data recovery circuit, means responsive to said in-phase and quadrature-phase error signals for generating control signals for said adjustable attenuators on each of said delay lines, means for cross-multiplying respective in-phase and quadrature-phase error signals from said generating means with the quadrature-phase and in-phase equalizer outputs to form cross-product signals, and means responsive to the differences between said cross-product signals from said cross-multiplying means for deriving control signals for the frequency and phase of the output of said demodulating carrier-wave source.--.

2. The data receiver defined in claim 1 further comprising means for applying said received signals directly to said equalizer in the passband frequency range, means for demodulating equalized passband received signals from said equalizer to the baseband frequency range, means for quantizing baseband signals from said demodulating means to preassigned discrete data-signal levels, and means for remodulating data-signal levels from said quantizing means to frequencies corresponding to the passband range effective at said equalizer, whereby said error differences are taken between passband signals respectively in the outputs of said equalizer and said remodulating means.--.

3. The data receiver defined in claim 1 further comprising means for demodulating quadrature-related received signals from a passband frequency range to a baseband frequency range before application to said equalizer, and means for quantizing baseband signals from said equalizer to preassigned discrete data-signal levels, whereby said error differences are taken between baseband signals respectively in the outputs of said demodulating means and said quantizing means.--.

4. The data receiver defined in claim 3 further comprising a jitter-compensating modulator interposed between said equalizer and said data recovery circuit, a local oscillator for providing a predetermined nominal frequency of expected phase jitter to said jitter-compensating modulator, and means for taking the difference between the cross-products of the quadrature-related outputs of said jitter-compensating modulator with quantized data signals from said quantizing means to form a control signal for said local oscillator.

5. A transversal equalizer for received signals modulating quadrature-related components of a common carrier wave transmitted at synchronous intervals comprising first and second delay lines each having a plurality of taps evenly spaced therealong at said synchronous intervals, a first and second attenuator connected to each tap on the respective first and second delay lines, first and second summation circuits for said quadrature-related received signals respectively traversing said first and second delay lines and the said attenuators connected thereto, first and second data decision circuits responsive to the outputs of said first and second summation circuits for quantizing the outputs thereof, means for generating respective in-phase and quadrature-phase error signals from the differences between the unquantized outputs of said first and second summation circuits and the corresponding quantized outputs of said first and second data decision circuits, means for multiplying the respective tap signals at synchronous intervals on each of said first and second delay lines with each of said in-phase and quadrature-phase error signals, first means for combining the direct products of the in-phase error and tap signals with those of the quadrature-phase error and tap signals to obtain a first attenuator adjustment signal, second means for combining the cross products of the respective in-phase and quadrature-phase error and tap signals to obtain a second attenuator adjustment signal, and switching means for applying the respective first and second attenuator adjustment signals in succession to each of said first and second attenuators during each synchronous interval.

6. The transversal equalizer defined in claim 5 in combination with third and fourth combining means for forming respective in-phase and quadrature-phase equalized output signals, and further switching means operating synchronously with said first-mentioned switching means for alternately connecting said first and second summation circuits to said third and fourth combining circuits during each synchronous interval.

7. In a data receiver for data signals synchronously modulated onto quadrature phases of a common carrier wave including a transversal equalizer structure having a delay line with taps located at synchronous intervals therealong for each of the quadraturerelated received signals, an adjustable attenuator connected to each tap on each delay line and a corresponding correlator jointly responsive to error and tap signals for determining the adjustment of each attenuator, and combining circuits for forming each of the in-phase and quadrature-phase equalizer outputs; and further including a demodulating carrier-wave source, a demodulator for respective in-phase and quadrature-phase received-signal components, and a data recovery circuit operating on demodulated in-phase and quadrature-phase received signals to derive quantized baseband data signals: the improvement comprising means for forming in-phase and quadraturephase error signals from the differences between respective in-phase and quadrature-phase outputs of said equalizer and said data recovery circuits, means responsive to said in-phase and quadrature-phase error signals for generating control signals for said adjustable attenuators on each of said delay lines, means for cross-multiplying respective inphase and quadrature-phase outputs of said equalizer with the quadrature-phase and in-phase quantized baseband data signals derived in said data recovery circuit to form cross-product signals, and means responsive to the differences between said cross-product signals from said cross-multiplying means for deriving control signals for the frequency and phase of the output of said demodulating carrier-wave source.--.

8. The data receiver defined in claim 7 further comprising means for applying said received signals directly to said equalizer in the passband frequency range, means for demodulating equalized passband received signals from said equalizer to the baseband frequency range, means for quantizing baseband signals from said demodulating means to preassigned discrete datasignal levels, and means for remodulating data signals from said quantizing means to the passband frequency range effective at said equalizer, whereby said error differences are taken between passband signals respectively in the outputs of said equalizer and said remodulating means.

* * * * *